United States Patent [19]

Taylor et al.

[11] Patent Number: 5,787,163
[45] Date of Patent: Jul. 28, 1998

[54] INTELLIGENT LOAD BALANCING OF SPECIAL SERVICE CALLS BASED ON AVAILABILITY OF TERMINATIONS

[75] Inventors: Frances D. E. Taylor, Falls Church, Va.; Christine S. Chaney; Christobal Alejandro Torres, both of Colorado Springs, Colo.

[73] Assignee: MCI Communications Corporation, Washington, D.C.

[21] Appl. No.: 739,993

[22] Filed: Oct. 30, 1996

Related U.S. Application Data

[63] Continuation-in-part of Ser. No. 352,319, Dec. 8, 1994, abandoned.

[51] Int. Cl.$^6$ ..................................................... H04M 7/00
[52] U.S. Cl. ........................... 379/265; 379/207; 379/221; 379/266
[58] Field of Search ..................................... 379/265, 266, 379/309, 220, 207, 221, 219, 242, 201

[56] References Cited

U.S. PATENT DOCUMENTS

| 4,737,983 | 4/1988 | Frauenthal et al. | 379/221 |
| 5,164,983 | 11/1992 | Brown et al. | 379/265 |
| 5,291,550 | 3/1994 | Levy et al. | 379/221 |
| 5,590,188 | 12/1996 | Crockett | 379/221 |

*Primary Examiner*—Ahmad F. Matar

[57] ABSTRACT

The termination availability database (TADB) of the instant invention performs routing decisions in response to call requests received from data access points (DAPs). The TADB takes each of the requests, which relate to a special service call of a subscriber, and determines the particular termination of the subscriber to which the call is to be routed. To perform its determination of where to route the calls, the TADB takes into consideration data collected from the network and the availability of the different terminations of the subscriber. In addition, allocation algorithms are used. Some of these algorithms include a precise percentage algorithm, a uniform call distribution algorithm, a sequential allocation routing algorithm, and a pure load balancing algorithm.

25 Claims, 12 Drawing Sheets

| | | | | | | | | | |
|---|---|---|---|---|---|---|---|---|---|
| 0:1 | 1:51 | 2:11 | 3:61 | 4:21 | 5:71 | 6:31 | 7:81 | 8:41 | 9:91 |
| 10:6 | 11:56 | 12:16 | 13:66 | 14:26 | 15:76 | 16:36 | 17:86 | 18:46 | 19:96 |
| 20:2 | 21:52 | 22:12 | 23:62 | 14:22 | 25:72 | 26:32 | 27:82 | 28:42 | 29:92 |
| 30:7 | 31:57 | 32:17 | 33:67 | 34:27 | 35:77 | 36:37 | 37:87 | 38:47 | 39:97 |
| 40:3 | 41:53 | 42:13 | 43:63 | 44:23 | 45:73 | 46:33 | 47:83 | 48:43 | 49:93 |
| 50:8 | 51:58 | 52:18 | 53:68 | 54:28 | 55:78 | 56:38 | 57:88 | 58:48 | 59:98 |
| 60:4 | 61:54 | 62:14 | 63:64 | 64:24 | 65:74 | 66:34 | 67:84 | 68:44 | 69:94 |
| 70:9 | 71:59 | 72:19 | 73:69 | 74:29 | 75:79 | 76:39 | 77:89 | 78:49 | 79:99 |
| 80:5 | 81:55 | 82:15 | 83:65 | 84:25 | 85:75 | 86:35 | 87:85 | 88:45 | 89:95 |
| 90:10 | 91:60 | 92:20 | 93:70 | 94:30 | 95:80 | 96:40 | 97:90 | 98:50 | 99:100 |

FIG. 8

| 8001 - ORG1: | LT1 50%<br>(1-50) | LT2 50%<br>(51-100) | | |
|---|---|---|---|---|
| 4 Calls: | 1 | – | | |
| | – | 51 | | |
| | 11 | – | | |
| | – | 61 | | |
| Allocation of Calls: | 2 | 2 | | |

| 8001 - ORG2: | LT1 40%<br>(1-40) | LT2 30%<br>(41-70) | LT3 20%<br>(71-90) | LT4 10%<br>(91-100) |
|---|---|---|---|---|
| 10 Calls: | 1 | – | – | – |
| | – | 51 | – | – |
| | 11 | – | – | – |
| | – | 61 | – | – |
| | 21 | – | – | – |
| | – | – | 71 | – |
| | 31 | – | – | – |
| | – | – | 81 | – |
| | – | 41 | – | – |
| | – | – | – | 91 |
| Allocation of Calls: | 4 | 3 | 2 | 1 |

INTELLIGENT LOAD BALANCING OF SPECIAL SERVICE CALLS BASED ON AVAILABILITY OF TERMINATIONS

RELATED APPLICATION

This application is a continuation-in-part of application Ser. No. 08/352,319 filed Dec. 8, 1994, now abandoned.

FIELD OF THE INVENTION

The present invention relates to a system and methods therefor for controlling the routing of special service telephone calls, such as 800 or 900 calls, through a telecommunications network, and more particularly relates to the routing and balancing of the traffic directed to the various terminations of the network based on the capacity availability of the respective terminations on a call by call basis.

BACKGROUND OF THE INVENTION

In a telecommunications network as presently used, when customers (subscribers) subscribe to a special service call number, such as 800 or 900, they usually would provide a number of help desks or stations staffed by multiple operators (or agents) around the country to answer the many callers of the special service call number. When someone calls the special service call number, for example an 800 number, a translation is made in a database to convert the dialed 800 number into a specific phone number in order to route the call to one of the various locations staffed by agents of the subscriber. Once the call is routed to a particular site, the call is handled by the agents at that location.

Ordinarily, the subscriber to the special call service has a number of locations to which calls are routed. The locations are typically equipped with customer premise equipment (CPE), known as automatic call distributors (ACDs). Each of the ACDs is staffed by multiple agents. Depending on the time of day, the location where the calls originate and other considerations, calls made to a particular 800 number may be routed to different ACDs. The respective sites of the subscriber are oftentimes assigned different rates, or percentages, for receiving the calls so that different amounts of calls are routed to the different ACDs. For example, given three sites to which calls may be directed, a fixed table in a database would assign different percentages to those sites—for example 20% to the first ACD, 30% to the second ACD and 50% to the last ACD. Having been assigned the respective percentages, the amount of calls to be directed to the different ACDs would remain constant relative to each other, irrespective of the capacity at each of the sites.

Also included in the fixed table are parameters such as the time of day, when the site begins business, the close of business, lunch times, etc. that allow a subscriber to change the amount of calls to be directed to the different sites at given times. Yet this allocation of where the calls are to be routed oftentimes does not match the actual circumstances at the respective sites. For example, overflows or shortage of staff do occur at the sites. Accordingly, optimal routing of calls is often not effected. In other words, there is an unbalancing of workload for the different agents at the different sites. This is particularly true when there is a sudden spike or peak in terms of the amount of traffic across the network. An example of this type of abnormal happening occurred during a political campaign in which the network was suddenly flooded with 800 calls originating from a given location. And these calls, according to the routing plan in the table set up in the database, were all to be directed to the closest ACD whose capacity was quickly overwhelmed.

An example of a prior art system is shown in FIG. 1. There routing plans of a special service call of a subscriber, for example a 800 number, are input to a network capabilities database system (NetCap) 4. Multiple routing plans are often input for each 800 number. For example, one of the routing plans may be for Monday, one for Tuesday, one for Wednesday, one for emergencies, one to exclude a specific termination and so forth. Only one of these routing plans is activated at any one time.

A service control manager (SCM) 6 is shown to be connected to NetCap 4. SCM 6, in actuality, is downloaded from NetCap 4 with the currently active routing plan, and is basically a system in charge of distributing the active routing plan into all of the connected thereto data access points (DAPs) 8. Thus, when a call comes into a DAP based on the 800 number, DAP 8 is able to determine that, with regard to this 800 number, 40% of the calls are to be routed to a first location and 60% of the calls are to be routed to a second location, for example. In essence, therefore, DAP 8 effectively translates the 800 number into a real switch termination.

Further shown in FIG. 1 is an intelligent call routing (ICR) system 10 described in U.S. Pat. No. 5,335,268. The disclosure of the '268 patent is incorporated by reference herein. In brief, ICR 10 is connected to a plurality of automatic call distributors (ACDs) 12 of the subscriber. From ACDs 12 the ICR 10 is able to retrieve information such as the number of calls and agents at the ACDs 12 so that it can intelligently interface with SCM 6, and to therefore update the active routing plan which the DAPs 8 use to route calls for the 800 number. For example, instead of the earlier discussed 40/60% allocation, ICR 10 may inform DAP 8 via SCM 6 that for the next interval of time, for example the next 5 minutes, the allocation of calls to the two terminations would be 50/50. With such scheme, however, there is no real measure of the volume of calls that is coming in at the time the routing decisions are made. In other words, there is a projection based on the network data of calls that are being collected, but there is no consideration of the individual incoming calls. Although near real time and effective, the load balancing method of the '268 patent nonetheless is not real time.

Accordingly, it is an objective of the present invention to provide a more dynamic, real time system and method for routing and balancing traffic of special service calls through a telecommunications network.

It is yet another objective of the present invention to provide a system and methods for routing and balancing the special service calls through a telecommunications network on a call by call basis.

It is moreover another objective of the present invention to provide a system and method of routing and balancing calls of a special service call number based on the instantaneous availability of the different terminations to which calls to the special service call number are routed.

SUMMARY OF THE INVENTION

The system of the present invention, in making a decision on where to route a special service call such as a 800 number call, takes into consideration the updated information about the availability at each of the designated sites on a call by call basis so that it can decide which one of the subscriber's terminations is most available (or most appropriate) to take the call. In other words, on a real time basis, the availability (or appropriateness) status of each of the terminations of the subscriber is reviewed and, despite whatever the routing plan of the subscriber demands, a determination is made by the system of the instant invention on whether to override the route plan so as to send a call to the most available/appropriate termination.

This call by call determination is achieved by following the routing plan of the subscriber, which may be in the form of a decision tree. Planted at various stages of the decision tree are trigger points which inform the system to use a particular algorithm residing in the memory of the system to determine the termination from among the identified terminations of the subscriber to which the call is to be routed. One of the algorithms that may be used by the system of the present invention is a precise percent allocation (PPA) algorithm. Another algorithm is a sequential allocation routing (SAR) method which also may be referred to as uniform call distribution (UCD). Yet another algorithm is a pure load balancing (PLB) method that may or may not include thresholds.

Thus, when a trigger point is encountered in the decision tree of the routing plan of the subscriber during call processing, the DAP will interrogate the system of the present invention for a recommended termination. Using the information of the terminations stored in the database at its disposal and based on the calculation of the algorithm invoked in response to the trigger point, the present invention system will respond to the DAP with the appropriate termination. This is done on a call by call basis to ensure that the responses are realistic and based on the most up-to-date information according to the selected algorithm.

The system of the present invention comprises a processor having its own database connected to each of the DAPs. For the discussion of the instant invention in this application, this system may be referred to as the termination availability database (TADB). Additional algorithms which may utilize the availability feeds of the TADB are planned for the future.

The PPA algorithm uses an array having a plurality of elements or numbers arranged to optimize the precision of the allocation of calls to terminations. An index acts as a pointer to the array, and specifically points to a given number along the array. As calls are received by the DAP, the index for that 800 number is incrementally moved along the array, one element for each call. The number on the array to which the index points provides the information for the TADB to instruct the DAP to route the call to the appropriate termination. Thus, each incoming call is represented by a number on the array which in turn indicates a particular termination of the subscriber to which that call is to be routed, on a call by call basis. When the index reaches the end of the array, it returns to the beginning of the array upon receipt of the next incoming call. The process again is repeated for further incoming calls.

The SAR algorithm associates an index to the terminations identified in the routing plan of a subscriber. This index is incremented as each call of the 800 number of the subscriber comes in. Thus, for each of the subsequent incoming calls, the index is incremented so that calls are uniformly routed to the different terminations.

The PLB algorithm provides a mechanism that allows calls to be balanced between available terminations according to the instantaneous measure of their availability. It specifically uses information from external systems to provide input from the customer premises, typically from the ACD or PBX or other equipment that is rolled-up into a standard form and fed as input to the algorithm. Between the intervals at which the information is updated, the PLB algorithm uses an interpolation method that includes utilizing so-called repletion and depletion factors to track the expected availability of the various terminations.

The entities against which the availabilities are measured are termination sets which are groups of terminations. An individual termination is a location that is considered to be the lowest level of granularity to which a call can be forwarded from the telecommunications network. Typically, groups of agents of the subscriber are associated at each of the terminations. Thus, pure load balancing is concerned with the state of the terminations, and compares all eligible terminations to find the one that is the most available to provide a response to the incoming call. Once found, the incoming call is routed to that most available termination.

BRIEF DESCRIPTION OF THE DRAWINGS

The above mentioned objectives and advantages of the present invention will become more apparent and the invention itself will be best understood by reference to the following description of the present invention taken in conjunction with the accompanying drawings, wherein:

FIG. 8 is a call allocation table illustrating the various numbers for the array of the precise percent allocation (PPA) algorithm of the instant invention;

DETAILED DESCRIPTION OF THE PRESENT INVENTION

Figure 1:
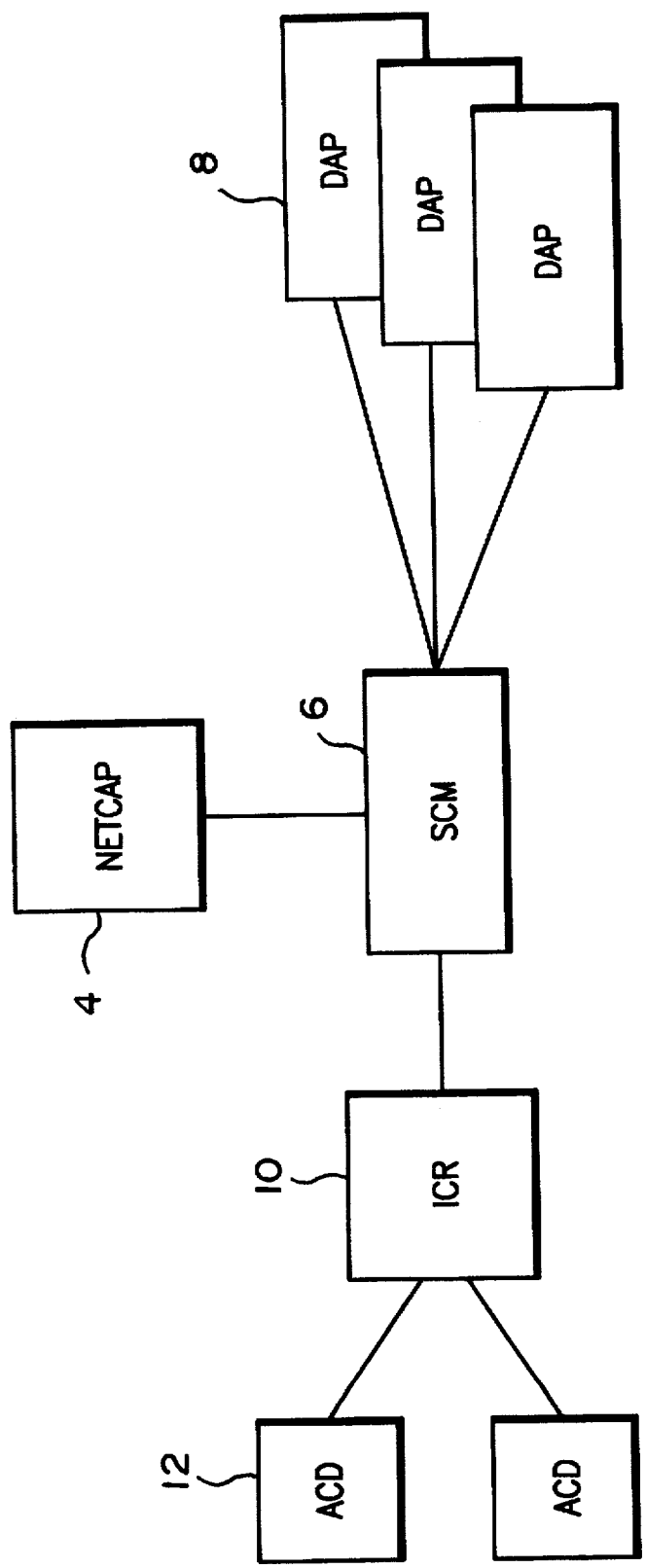
FIG. 1 is a simplified diagram illustrating a prior art call routing system.
Figure 2:
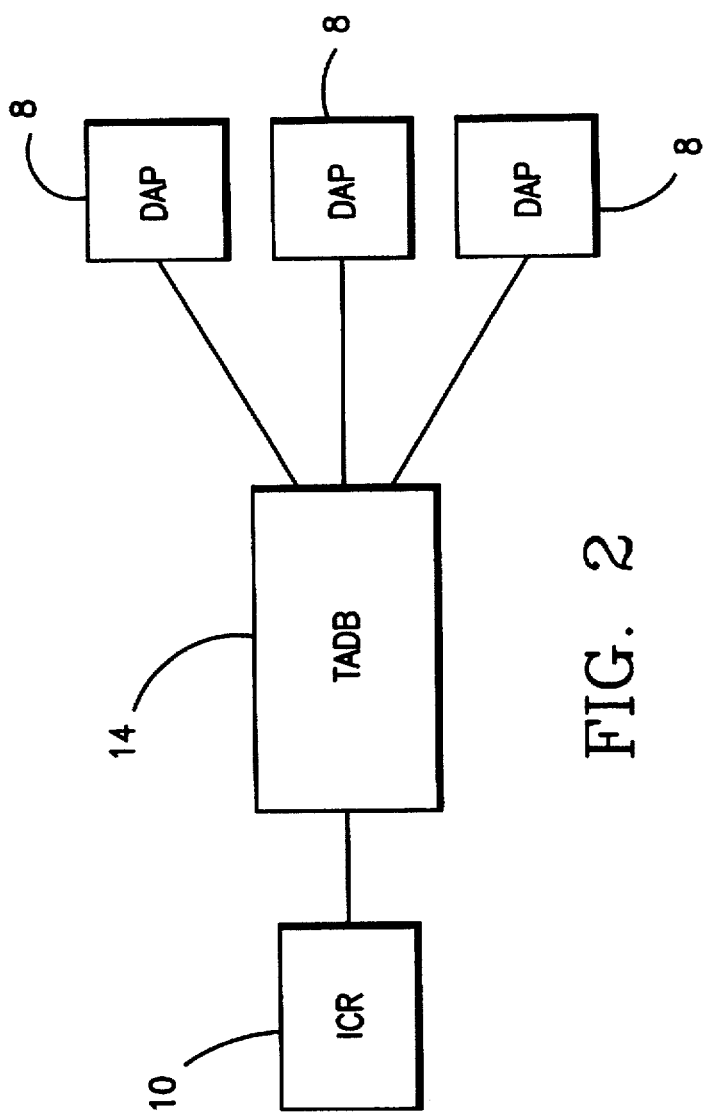
FIG. 2 is a simplified block diagram illustrating the TADB of the present invention, as it is connected to other components of the network.

With reference to FIG. 2, the present invention system termination availability database (TADB) 14 is shown to be connected to a plurality of DAPs 8 and an intelligent call routing system (ICR) 10. An ICR command intelligent common language interface (ICLI) provides interfacing between ICR 10 and TADB 14. Customer premise equipment (CPE) and network data collected by ICR 10 are used to provide an availability feed to TADB 14. In addition, by means of the interconnection therebetween, TADB 14 communicates with DAPs 8 which, in receipt of the routing plans from the subscribers, would allocate special service calls received to different terminations in accordance with the subscriber's routing plans.

Figure 3:
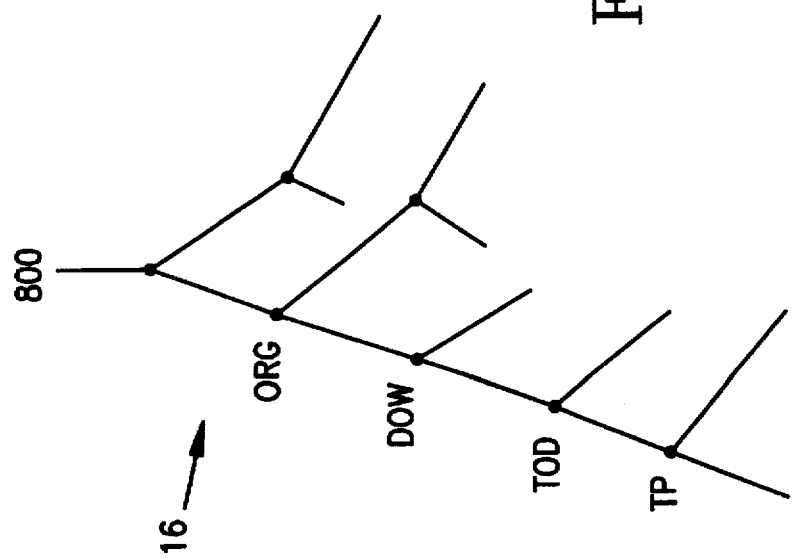
FIG. 3 is an exemplar routing plan of a subscriber of a special service call.

To provide more effective routing of the incoming calls, each of the routing plans includes a decision tree, such as 16 shown in FIG. 3. As shown, the decision tree is identified by its 800 special service call number. Focusing only on the left branch of the tree, it should be noted that the origination of the call is identified at a node designated ORG. The day of the week is identified at the node designated DOW. The time of day is identified as TOD at a lower node. At a branch node thereunder, there is a trigger point (TP) or trigger ID. When TP is encountered during call processing, DAP 8 will interrogate TADB 14 for a recommended termination.

Based on the algorithm used which is selected by the trigger point, and the availability of the different terminations calculated from a variety of data from ICR 10 including CPE and network statistics, TADB 14 calculates from among the different identified terminations of the subscriber the most appropriate termination for the DAP to route an incoming call.

Further with reference to FIG. 3, it should be noted that a plurality of trigger points may be set up at any of the various nodes of the tree of the routing plan of the subscriber. Each of the trigger points is an indication to the DAP that it must branch out of its normal (default) call processing and interrogate an external system for additional routing information. In the case where DAP 8 is to interrogate TADB 14, TADB 14, upon receipt of the request from the DAPs, will use the trigger point to determine the method of routing, in conjunction with other information in its databases. It should be noted, however, that the interconnections between TADB 14, DAPs 8 and ICR 10 are as shown in FIG. 2 only for the sake of clarity.

Figure 4:
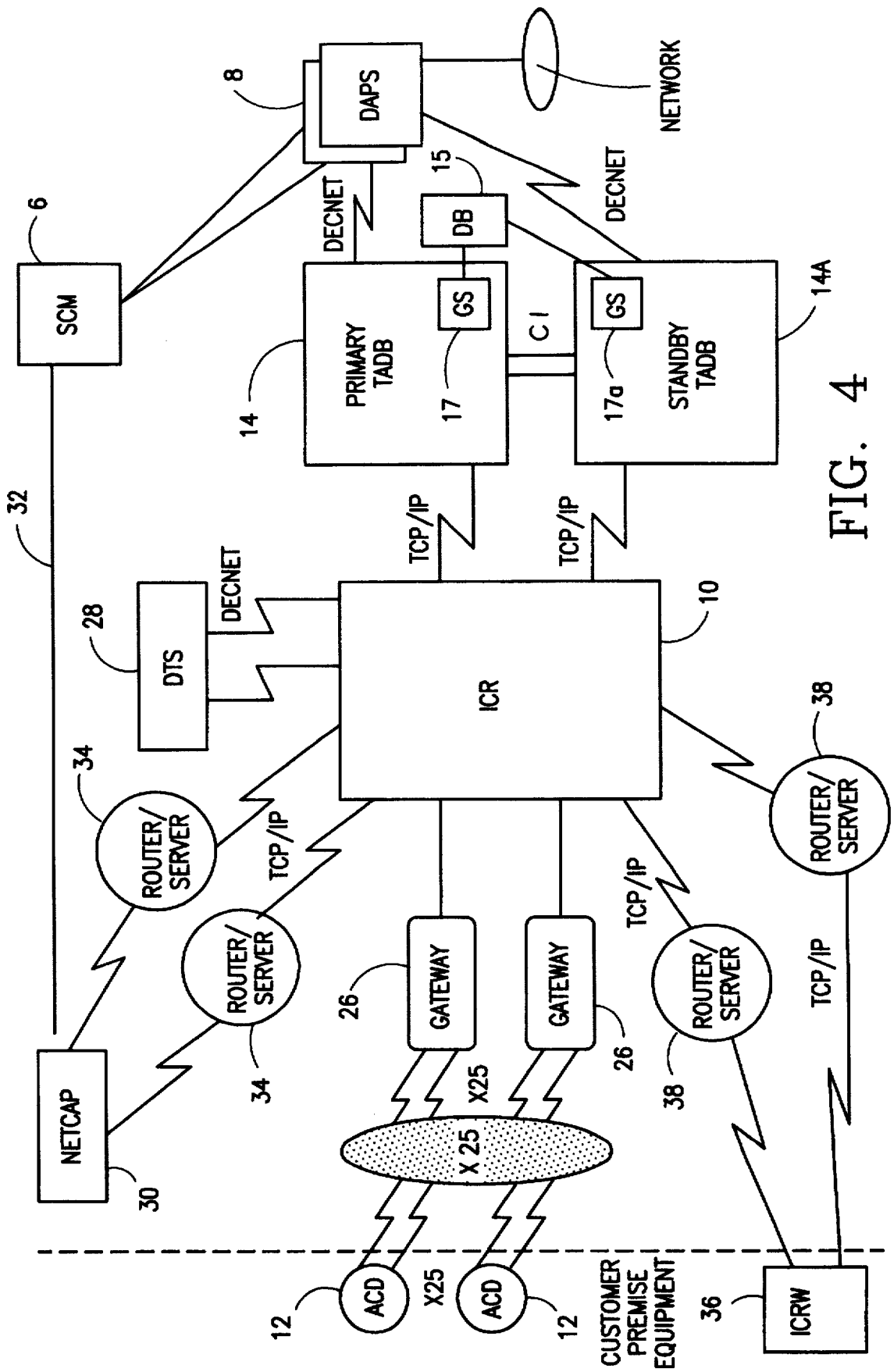
FIG. 4 is a diagram illustrating the different hardware components of the system of the instant invention and its connection to the various hardware components of an intelligent telecommunications network.

FIG. 4 provides a more detailed illustration of the hardware components of the present invention system. As shown, TADB 14 of FIG. 2, in actuality, comprises a primary TADB 14 and a standby TADB 14a. These TADBs are in fact made up of computer systems such as for example the DEC VAX 7610 system. As shown, of the two clustered processors, only TADB 14 is active while TADB 14a is on hot standby. Thus, if TADB 14 fails, TADB 14a will pick up the processing. As further shown, TADB 14 is connected to TADB 14a by a connection line, identified as CL. Thus, both TADB 14 and TADB 14a contain the same information.

Further shown to be connected to each of TADBs 14 and 14a is a database 15 for storing, among other things, current information regarding the respective availabilities of the terminations, in their respective global sections 17 and 17a. A global section is an area of the memory in TADB 14 (and TADB 14a) that is mapped to the disk memory of the database. This mapping allows the TADBs to have a synchronized image of the disk file in the memory of database 15 so that if ever there is a failover in the primary TADB 14, the standby TADB 14a would promptly take over operation by accessing the disk and bring its standby memory up-to-date, i.e., set its computer memory to the active mode. The availability information for each termination (or termination set to be discussed infra) may include data relating to its agent availability, its throughput, the number of calls in queue, its utilization and its average speed of answer time.

Figure 5:
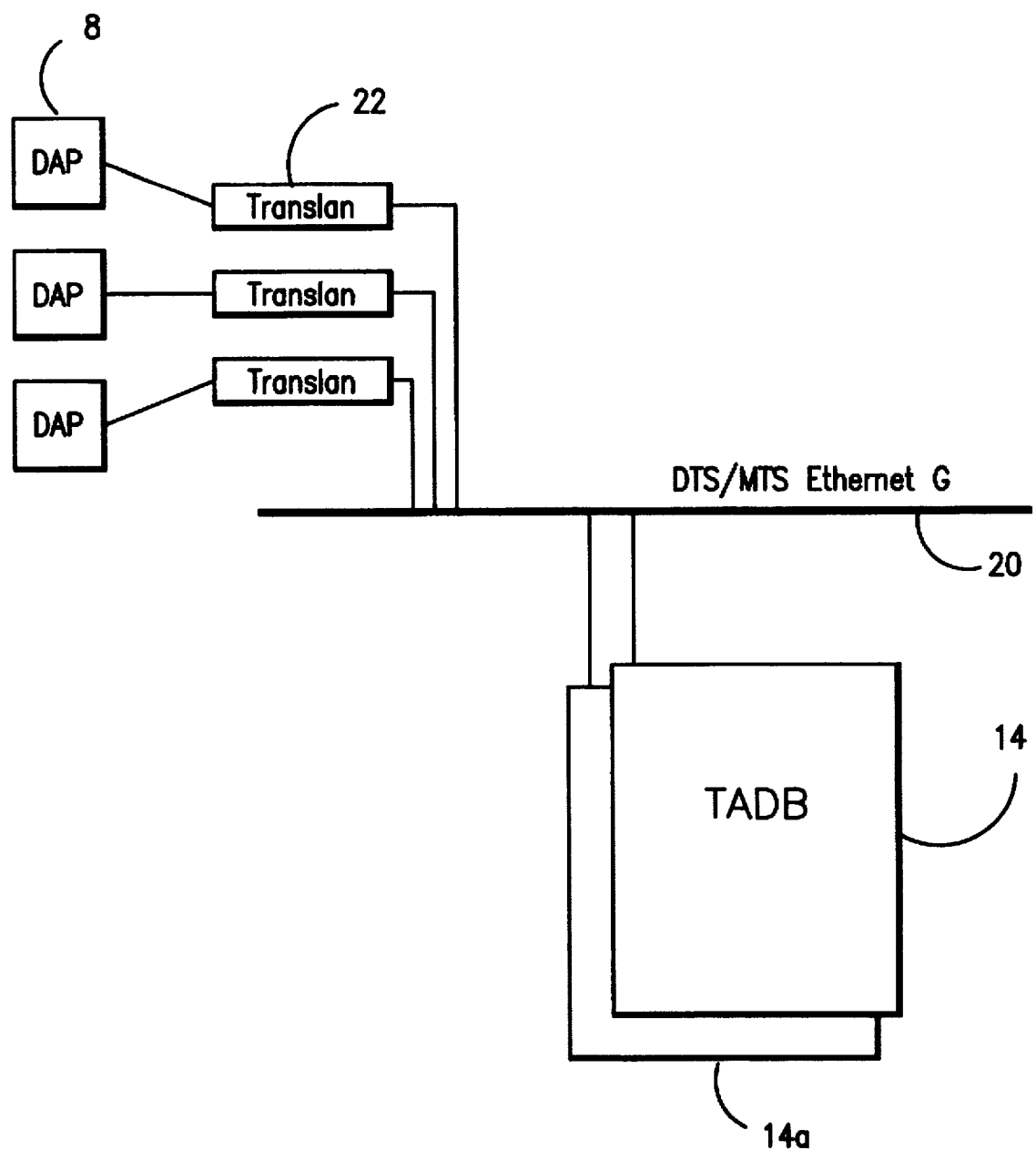
FIG. 5 is a diagram illustrating the connection of the TADB of the instant invention to the network.

TADBs 14 and 14a are shown to be connected to DAPs 8 by means of a DECNET network. As more clearly shown in FIG. 5, TADBs 14 and 14a are connected to an ethernet rail identified as DTS/MTS ethernet G 20. Also connected to ethernet 20 are a plurality of translan bridges 22 to which the different DAPS 8 are connected.

Return to FIG. 4. As further shown, TADBs 14 and 14a are connected to ICR 10 by respective transmission control protocols/internet protocols (TCP/IP) connections. As is well known, the TCP/IP connections are in essence computer interfacing connections for providing communication between TADBs 14 and ICR 10.

ICR 10 includes an intelligent routing host (IR host) that interfaces with a plurality of automatic call distributors (ACDs) 12 via an X.25 network. As shown, connecting the ACDs 12 and ICR 10 is an X.25 network 24 and a number of gateways 26 for providing wide area network (WAN) to local area network (LAN) interfacing between ICR 10 and ACDs 12. The ACDs provide feedback in the form of agent availability and call handling times.

Also shown to be connected to ICR 10 is a DAP traffic statistics (DTS) system 28 for collecting network traffic statistic and routing the data to ICR 10 through a DECNET network. In brief, DTS 28 gets statistics data, relating to the dispositions of calls in the network from DAPs 8 in predetermined time intervals, for example 5 minute intervals. This information includes data point statistics which, in essence, informs the system for each 800 number when the trigger points are used, where the calls are routed, and whether the calls are actually terminated from the perspective of the network. DTS 28 in essence provides a feedback from the network.

Further shown to be connected to ICR 10 is a network capability (NetCap) system 30. It is at NetCap 30 that routing plans from the subscribers are input, and where information relating to the trigger points and the percentage allocations and the priorities of the terminations are downloaded into SCM 6, which distributes them to the DAPs 8 via connection 32. By means of the TCP/IP connection and the router/server 34 in the TCP/IP network, information relating to the terminations being referenced by the routing plans are also provided to ICR 10. This enables ICR 10 to send updated information to TADB 14.

Further shown to be connected to ICR 10 is an intelligent call routing work station (ICRW) 36. ICRW 36 is connected to ICR 10 by means of TCP/IP networks, and router/servers 38 connected thereto. ICRW 36 is a work station which may be located at the subscriber's premises to provide the subscriber the ability to enter management and configuration information.

Figure 6:
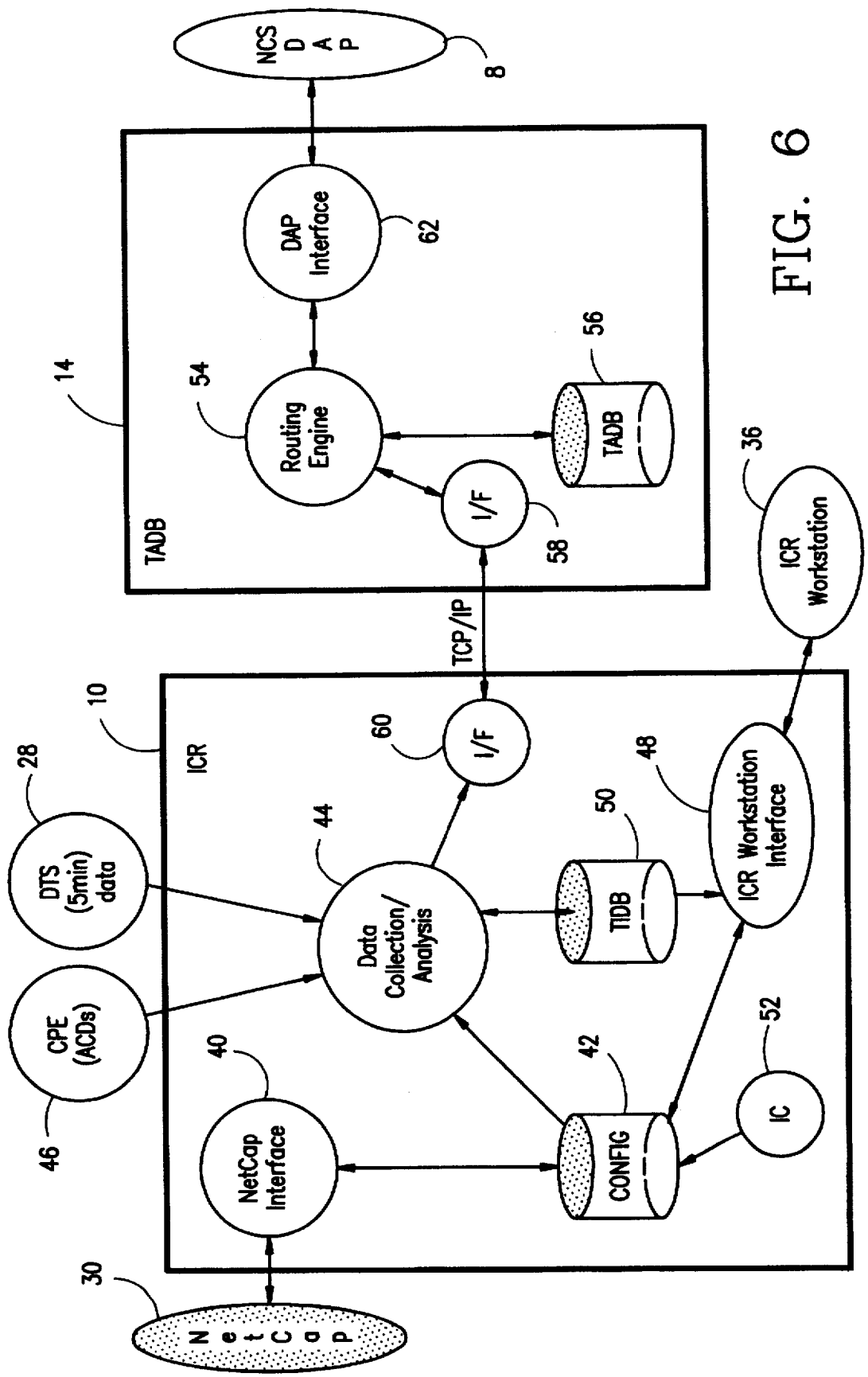
FIG. 6 is a diagram illustrating the interrelation between the intelligent call routing element (ICR) of the network and the TADB of the instant invention.

The interaction between TADB 14 and ICR 10 is further illustrated in FIG. 6. As shown, configuration data is exchanged between NetCap 30 and the CONFIG database 42. Data from CONFIG database 42 is retrieved by the data collection/analysis process 44, which may be an application residing in the processor of ICR 10. In addition to ICRW 36, data from the CPE at the subscribers' premises, for example the ACDs, are provided to processor 44. Also provided to processor 44 is the traffic statistics data, provided for this embodiment in 5 minute intervals, from DTS 28. With respect to ICRW 36, it should be noted that an ICRW interface 48 is provided between ICRW 36 and the CONFIG database 42. In addition, information from data collection/analysis processor 44 is fed to a traffic information database (TIDB) 50. An ICRW interface 48 retrieves information from TIDB 50 and forwards it to ICRW 36. Control of CONFIG database 42 is provided by internal controller (IC) 52.

TADB 14 is connected to ICR 10 via a TCP/IP network connection. As shown in FIG. 6, the process of TADB 14 contains a routing engine process 54, which is further described with reference to FIG. 7. Connected to routing engine 54 is a memory medium, for example a magnetic or electronic memory 56, used as the database of TADB 14. Processor 54 is connected to an interface (I/F) 58 for communicating with a similar interface 60 residing in ICR 10. Further shown to be connected to processor 54 is a DAP interface 62 which allows TADB 14 to communicate with the DAPs which communicate in turn with the switch at which the call originated.

Figure 7:
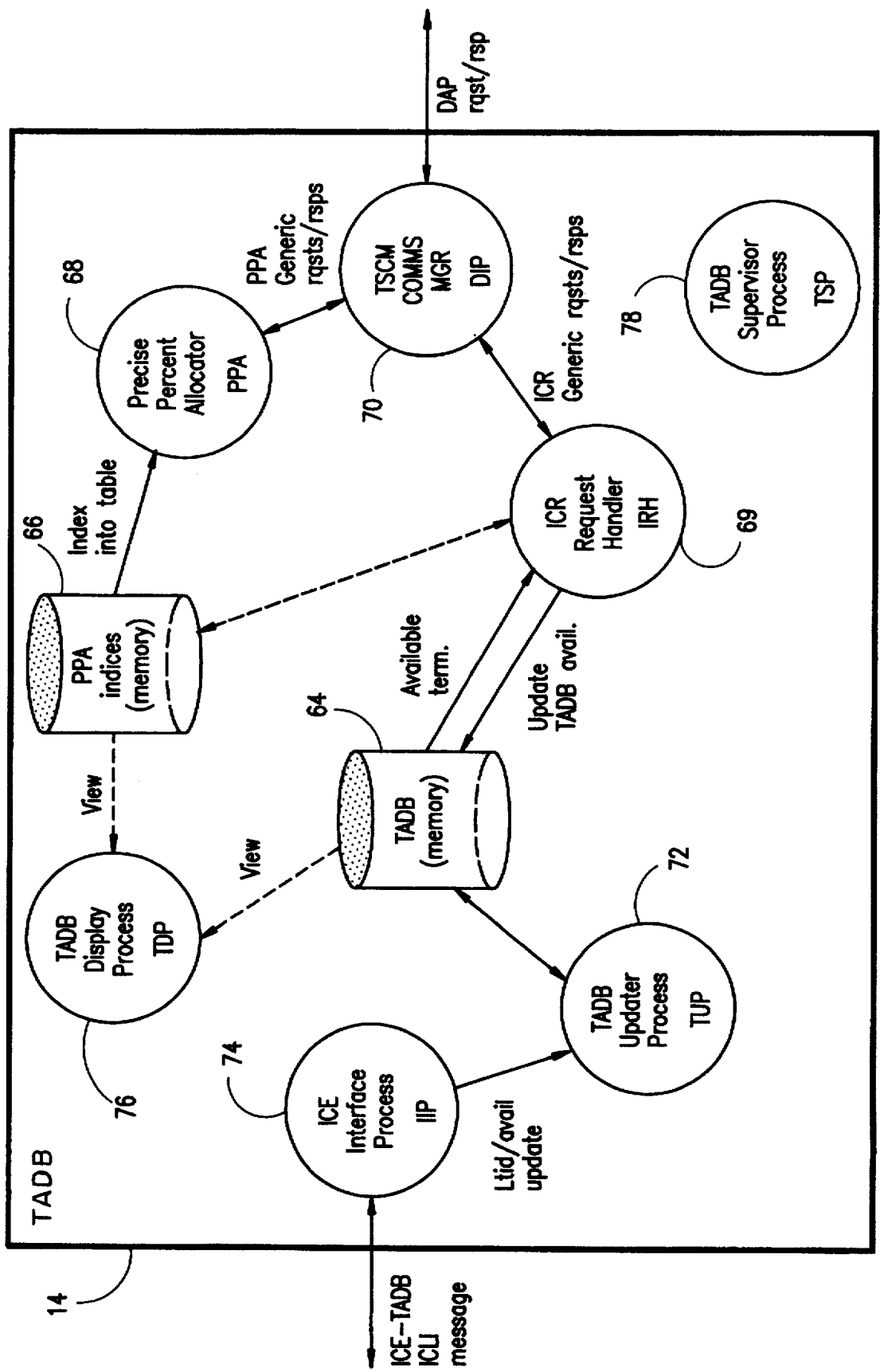
FIG. 7 is a process and data flow diagram illustrating the internal workings of the TADB of the instant invention.

As further illustrated in the more detailed process and data flow diagram of FIG. 7, there are a number of processes being effected in TADB 14. As shown, there are two parts to the TADB database 56, namely a TADB memory 64 and a precise percent allocation (PPA) indices memory 66. The PPA memory 66 contains indices for the PPA and SAR algorithms, to be discussed later; while the TADB memory 64 contains information relating to the termination sets that are used for load balancing algorithms, namely the pure load balancing (PLB) algorithm and percent allocation with load balancing above threshold (PALB) algorithm. The PPA and SAR algorithms are represented by the PPA process designated 68 while the PLB and PALB algorithms are represented by the ICR request handler (IRH) process 69.

Interacting with the PPA and IRH routing processes 68 and 69, respectively, is a transaction server communication manager (TSCM) 70 which interacts with DAPs 8. TSCM 70 is a standard network control system (NCS) transaction server communication manager application which handles the communications between the DAPs and two TADB request handler processes, namely IRH (ICR request handler) and PPA, which perform the routing decisions in response to requests from the DAP. Information needed to perform routing is stored in the PPA memory 66 and also the termination availability (TA) databases that are stored in TADB memory 64. The request handlers access and update the databases, according to the type of routing being performed. The databases are also updated in response to messages from external systems, such as that from ICR 10, which provide feedback from the network (via DTS 28) and customer premise equipment (CPE) 46.

Given that a detailed description of the PPA algorithm has not been given, it is sufficient for now to note that the PPA process is concerned with call routing based on a termination array's percent allocations (PPA) or a termination array's sequential order (SAR). Hence, access to the TA database is not required for these routing algorithms. The PPA process adds information to the PPA database as calls from new subscribers are received. The IRH process involving the PLB and PALB algorithms will be described in detail infra.

A TADB supervisor process (TSP) 78 is responsible for starting the processes, and restarting them if they terminate unexpectedly. For redundancy, the TADB system is maintained on two processing nodes, and the supervisor controls which of the two is the active node and handles failover between them. The supervisor communicates with individual processes via a set of commands which relate to process activity states and configuration information. This enables changes to be made while processes are running.

As further shown in FIG. 7, connected to TADB memory 64 is a TADB updater process (TUP) 72. Connected to TUP 72 is an ICE interface process (IIP) 74 which interacts with ICR 10 and provides the available updated information to TADB via TUP 72. A TADB display process (TDP) 76 is also performed by the processor of TADB for viewing the PPA memory 66 and TADB memory 64.

As routing requests are received from the DAP, TSCM 70 would first validate the message and then pass the request to PPA 68 or IRH 69, according to the type of routing that has been requested. A response is formatted and returned to the originating DAP, and another request is read.

The routing request from the DAPs are constructed according to the information contained in the routing plan stored therein, and are formatted as generic request messages containing a fixed message header, followed by a number of optional components. Two of the optional components, namely database keys and call allocation array, are used in the TADB call routing.

The routing request has a header which contains a trigger ID field for specifying the particular algorithm that is to be used to process the routing request. This is used to determine which process is to handle the request.

The second optional component of the DAP routing request that is used by TADB 14 is the database keys component which provides information about the routing plan at which the trigger point was encountered. The customer and the originating area ID are used by TADB 14 to identify a particular index to be used in making the routing decision in the PPA database. (More on the index later in the discussion of the PPA algorithm.) If a call request is received which has a previously unencountered customer key and an originating area ID combination, a new PPA database entry is created and initialized.

The first of the routing algorithms, namely precise percent allocation (PPA) noted above, is discussed in detail herein with reference to FIG. 8. In particular, percent allocation describes a call routing method in which calls in a sequence of call requests for the same set of terminations are distributed among the terminations in exactly the same proportions specified for each of the terminations in the requests. Its main use is for call requests having the same customer key and originating area ID, which are to be distributed among the terminations defined at a given node at the currently active routing plan of the subscriber (where the trigger point is located). For the aforenoted co-pending application, percent allocation may also be used to resolve equal availabilities among the terminations.

The PPA database 66 (FIG. 7) contains an entry, and therefore an index for every customer key/origination ID combination which appears in the routing requests. As new key combinations are encountered, records are added to the database. A utility runs at regular intervals to remove those records that have not been accessed recently, thereby preventing the database from becoming filled with unused entries.

Each of the records contains two PPA indexes, a main index which is used for normal percent allocation routing requests, and a tie index which is accessed when percent allocation is used to resolve ties of equal availability. (This second index will be further described in the aforenoted co-pending application). For the instant invention, main indexes are maintained in the range of 1-100, in actuality from 0-99.

In the first percent allocation method, to be referred to herein as the precise percent allocation (PPA) algorithm, the 100 numbers are generated and shown in the call allocation table of FIG. 8. The generation of the numbers of the FIG. 8 table will be described with reference to a particular equation, to be discussed, infra. As shown, the FIG. 8 table is an array of 100 elements each of which contains a number in the range of 1-100. The order of numbers in the table is chosen to produce an evenly spread distribution sequence over its range.

Figure 9:
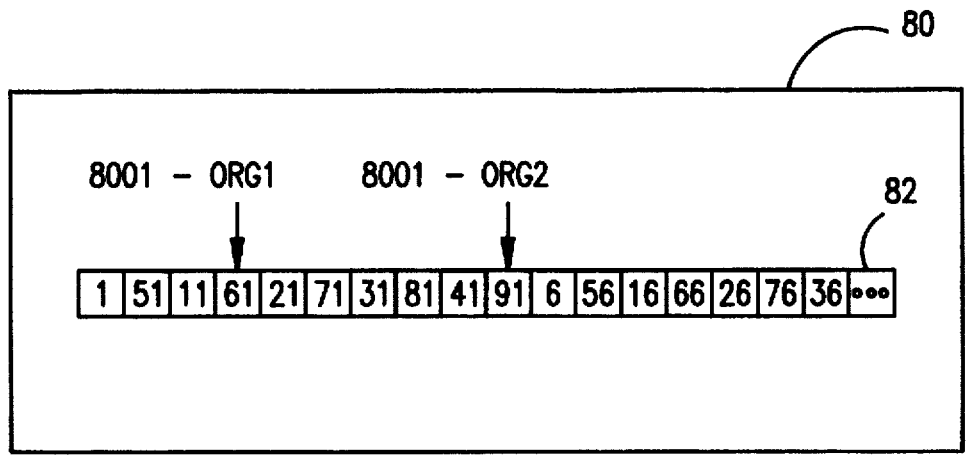
FIG. 9 is an illustration for enhancing the understanding of the precise percent allocation algorithm.

FIG. 9 is an illustration of an exemplar sequence of the array of FIG. 8 which enables the TADB 14 to route successive calls made to a special service call number, in the specified proportions, to the terminations identified by the subscriber in his routing plan.

As shown, array 82 is comprised of a number of elements each having a different number in the range of 1-100.

Putting it differently, the numbers of array 82 are located at different positions, or locations along the array.

Further shown are two indexes, designated ORG 1 and ORG 2 each representing a special service call, for example a 800 number, subscribed by a customer. ORG may be assumed to be the origination area, or NPA, at which particular calls to that special service originate. For the discussion of FIG. 9, ORG 1 and ORG 2 may also be referred to as index 1 and index 2, respectively. Indexes 1 and 2 are movable along array 82 sequentially according to each call (or call request) received by TADB 14 for each of the call numbers represented thereby. For example, insofar as index 1 is pointing to number 61 of array 82, when the next call directed to the same 800 number is received in TADB 14, index 1 will be incremented by 1 along array 82 to the next position, represented by number 21. These numbers in array 82 in fact represent indirectly the terminations to which calls are to be routed. Putting it differently, at every call attempt, each candidate termination in the call request is assigned a number range, known as its allocation range, which is proportional to its specified percent allocation. The allocation range is assigned to candidate terminations in a single request start at 0 and are contiguous and non-overlapping. The appropriate PPA index, for example either index 1 or index 2, is then accessed from the database and used to index the call allocation table, for example array 82. The selected termination is the one in whose allocation range the number accessed from the table falls. Thus, because the candidate terminations are present in the same order in each request (so that they are allocated the same number range for each call), the terminations will be selected in exactly the same proportion as their specified percent allocation. The choice of the array sequence in FIG. 8 ensures that the proportionality is accurate over a small number of call attempts.

Putting it simply, assume for the FIG. 9 example that calls directed to the first 800 number (i.e., ORG 1) are to be routed to two identified terminations of the subscriber, namely LT1 and LT2. Further assume that each of the terminations LT1 and LT2 is to be assigned a 50% allocation so that in essence, each of the terminations LT1 and LT2 should receive the same number of calls for the specific 800 number. Accordingly, the numbers in the array are divided such that numbers 1–50 are assigned to termination LT1 while numbers 51–100 are assigned to termination LT2.

Now assume that four calls (or call requests) are received by TADB 14. Assuming that the first call started at the first position or element of array 82 (i.e., number 1), index 1 originally would be positioned at number 1. Since number 1 falls between the numbers 1–50, TADB 14 would inform the DAP that the first call is to be routed to termination LT1, which may be an ACD located in the east coast.

Upon receipt of the second call directed to the same 800 number, index 1 is incremented to number 51, the second element of array 82. Since number 51 is a value falling between 51 and 100, TADB 14 would inform the DAP to route the call to termination LT2, which may be an ACD located in the west coast.

For the third call directed to the same 800 number, index 1 is moved to number 11, which is between numbers 1–50. Accordingly, that call is routed to termination LT1. Similarly, upon receipt of the fourth call, index 1 is incrementally moved to the next position corresponding to the number 61. And since 61 falls between 51 and 100, that call is routed to termination LT2. Accordingly, for those four calls, two of the calls are routed to termination LT1 while the remaining two are routed to termination LT2. Do note that these proportions are accurate after every 2 calls.

A second example of the FIG. 9 array can be had with reference to the 800 number represented by index 2 of ORG 2. The subscriber of this particular 800 number has identified four terminations to which calls to that 800 number may be routed. The subscriber furthermore has assigned to each of those terminations a particular percentage, namely 40% for termination LT1, 30% for termination LT2, 20% for termination LT3 and 10% for termination LT4. Accordingly, the following division of numbers is provided for the different terminations: 1–40 for termination LT1, 41–70 for termination LT2, 71–90 for termination LT3 and 91–100 for termination LT4.

As shown in FIG. 9, each of the ten calls made to the second 800 number is compared against the allocation range assigned to the element to which index 2 designates the call along array 82. Thus, call 1, since it fell on number 1 which is between 1–40, was routed termination LT1. The second call, being designated 51 which is between 71–90, was routed to termination LT3. The remaining calls similarly were routed to the respective terminations LT1 to LT4 per shown. When all 10 calls are taken into consideration, as indicated by the respective locations pointed to by index 2 on array 82, it can be seen that 4 of the calls have been routed to termination LT1, 3 to termination LT2, 2 to termination LT3 and 1 to termination LT4. Such routing of the calls fit perfectly with the percentage set by the subscriber to the terminations and is accurate over only 10 calls.

In essence, therefore, the PPA method can be used for whatever the percentages are and however many terminations there are for each of the customers. The only thing that needs to be remembered in the PPA database is the location in the array so that the index may be incremented upon receipt of the next call. This has the effect of remembering where the last call was sent, so that the next call may be automatically sent to the next termination in accordance with the percent allocated by the subscriber. Putting it yet somewhat differently, the PPA method is a way of automatically routing calls without having the need to store substantial amounts of information on a per customer ORG basis, as the information is already contained in the array, and the index itself is stored on a per customer/ORG basis.

When the index representing the 800 number reaches the end of the array, upon receipt of the next call request, the index is automatically returned to the first element of the array so that the same set of numbers in the array are used over and over again, in sequence. The same array is used for all routing requests, only the per customer/ORG index changes.

Notwithstanding the above, special consideration should be taken when the total of the percent allocation for a set of candidate terminations is not 100%. This normally does not happen if the routing plans have been correctly entered and validated as occurs at NetCap. But in the event that the percent allocation for terminations do not add up to 100%, then the number sequence that is used to distribute the calls is reduced accordingly. For instance, if the sum of percent allocations, designated for example by N, is less than 100, the repetition cycle becomes N, instead of 100. The ratios of calls routed to candidate terminations would accordingly remain exactly as specified by the percent allocations. Do note that this feature is used in PLB/PALB routing for resolving equal availabilities and will be discussed in further detail in the aforenoted co-pending application.

In the event that N exceeds 100, then the allocations are scaled. But the repetition cycle remains at 100. Because scaling involves rounding, the ratios cannot exactly reflect the percent allocations. And because of the repetitive nature of the algorithm, the same terminations will receive the "odd" calls in cycles. Thus over time, it might appear to diverge somewhat from the specified percent allocations. However, NetCap disallows N greater than 100 in the routing plan.

Another abnormality that should be taken into consideration is a percent allocation of 0. This 0% allocation is valid for routing request. In brief, it has the effect of removing terminations from consideration under the PPA method, but still retain them as candidate terminations for other routing algorithms, including SAR. Under PPA, terminations having a percent allocation of 0% are assigned allocation ranges of 0 and consequently are disregarded. If all terminations in a routing request have a percent allocations of 0%, then obviously no selection has been made by the subscriber, and a use "default" response is returned by TADB 14 to the DAP so that all calls to that 800 number are routed according to the defaults stored at the DAP. Under SAR, percent allocations are ignored and routing is solely based on the order of terminations in the allocation array. Accordingly, even 0% terminations are eligible in the SAR method.

The numbers of the FIG. 8 array are obtained according to the following equation (1):

$$n_i = (i\% \ 2)*50 + (i/2\% \ 5)*10 + (i/10\% \ 2)*5 + (i/20\% \ 5) + 1$$

where:

n represents a set of numbers in the range of 1–100 i represents the array index (0–99)

$n_i$ is the value of the $i^{th}$ array element

/ represents integer division, truncated towards 0

% represents the remainder after division

For example, element 40, when plugged into equation (1), yields the number 3. This results from obtaining a 0 from the first three terms and a 2 for the fourth term of equation (1). A more detailed discussion is as follows. For the first term [(i% 2)*50], 40 divided by 2 yields integer 20. Accordingly, there is no remainder and therefore the first term yields a 0. For the second term [(i/2% 5)*10], 40 when divided by 2 yields 20 and 20 divided by 5 yields 4 which also is an integer. Accordingly, term 2 also yields 0. For the third term [(i/10% 2)*5], 40 divided by 10 yields an integer 4, which in turn when divided by 2 yields an integer 2. Thus, Term 3 also yields 0. In term 4 [(i/20% 5)], since 40 divided by 20 yields 2 and 2 is not divisible by 5 as an integer. Then 2 remains. Accordingly, when the result of term 4, namely 2 is added to 1, the number 3 is obtained for element 40 of the FIG. 8 table.

A second example may be had with respect to element 37. In term 1 of equation (1), since 37 divided by 2 yields 18.5. There is a remainder. And since 18 times 2 is 36 and the number of element 37 is 37, then a remainder of 1 results. This reminder when multiplied by 50 yields 50 for the first term. In the second term, 37 divided by 2 yields 18.5. Dividing only integer 18 by 5 yields a remainder of 3. This remainder 3 is multiplied with 10 to yield a result of 30. For the third term of equation (1), 37 divided by 10 yields 3.7. Taking only integer 3 into account and dividing that by 2 yields a remainder of 1. Multiplying 1 with 5 yields 5 for the third term. In the fourth term, 37 is divided by 20 to yield an integer of 1 which, when divided by 5, yields a remainder of 1. When all of the numbers of the various terms (50+30+5+1+1) are combined, 87 results. And 87 of course represents the percent allocation of element 37 of the array of FIG. 8.

Yet another example of using element 53 of the array would yield 50 for the first term, 10 for the second term, 5 for the third term and 2 for the fourth term. Adding those numbers together with the 1 of the last term of equation (1) yields 68.

The rest of the numbers of the array of FIG. 8 are obtained likewise.

A second method or algorithm that may be used with TADB 14 is the sequential allocation routing (SAR). SAR essentially mirrors PPA in that an index for a particular 800 number and ORG combination is also used. However, for SAR, no attention needs to be paid to the contents of the elements of the array. Rather, it is the index that is used to select the next termination from among those identified by the subscriber, so that sequential call requests to TADB 14 are routed to the respective terminations sequentially. For the PPA and SAR methods, these terminations may be considered to be ordered representations.

For example, consider the case where a subscriber has designated four terminations to which calls to a particular subscribed 800 number/ORG are to be routed. Using SAR, the index for this 800 number is directly interpreted as a termination in the allocation array.

Thus, for an array having only four elements for the exemplar SAR, the first element is labeled 0, the second 1, the third 2, and the fourth 3. Assume the index for the SAR is pointed to the beginning of the array, i.e., at element 0. Thus, the first call is routed to termination 1, the second call to termination 2, the third call to termination 3 and the fourth call to termination 4. Subsequent calls are again sequentially provided to terminations 1, 2, 3 and 4 repeatedly. Of course, with the movable index, the termination to which the next call is to be routed is remembered. For the SAR method, the index may be thought of as a counter in which a sequential counting of the various elements of the array is kept.

As noted above, yet another method of routing calls to the various terminations operated by a subscriber is a pure load balancing (PLB) algorithm which includes an ancillary method, namely a load balancing above threshold (PALB) algorithm. The PLB algorithm, like the earlier PPA, UCD and SAR methods, may also be embodied in TADB 14, and specifically in TADB memory 64. Unlike the PPA and SAR methods which focus on the order of terminations to which calls are to be forwarded, the PLB method is more concerned with the state of the terminations by comparing all eligible or candidate terminations to find the one that is most available to provide a response to an incoming call. Since this calculation of the most available termination is done prior to the forwarding of the incoming call, the number of call completions is increased.

For the PLB and PALB methods, the terminations that are operated or staffed by the subscriber with its agents are identified as potential candidate terminations to which incoming calls directed to the subscriber are routable. These various terminations operated by the subscriber may be located in the different regions of the country and therefore are grouped into termination sets (TSETs). Each TSET may be associated with one or more terminations and represents the resource (such as an agent pool) that is available for handling calls sent to any of the terminations associated with it. If a TSET has at least one termination staffed with agents of the subscriber, that TSET may be considered as a candidate TSET. Sometimes, within a given TSET there may be multiple terminations that are staffed by the same subscriber. In those instances, the PLB method incorporates either the PPA or the SAR methods for determining which of the terminations within that TSET an incoming call may be routed, after a determination has been made that the subscriber staffed terminations within that TSET are all equally available. More on that later. The record of the candidate terminations are stored in TADB 14. In particular, the data relating to the terminations and termination sets are stored in a termination availability database such as 15 shown in FIG. 4. These termination records provide identification of the terminations that may be candidates for specific incoming calls and the respective TSETs to which each of those terminations relates.

With respect to the availability of the different terminations, the following definition should be borne in mind. As defined herein, availability is a measurement of the call handling resources associated with a TSET. Thus, the availability for each TSET will vary according to the number of calls being handled and the number of agents available to take those calls. The calculation of availability is dependent on the individual subscriber.

The PLB and PALB methods operate independently of the method used to calculate availability. For each of those methods, availability is assumed to be represented as a signed, single precision floating point number for which an increasing (more positive) value corresponds to a greater availability. The actual definition of availability, as noted above, depends of course on the specific requirements of each subscriber, and the capabilities of each subscriber's equipment to measure the state of the call handling resources. The definition of availability for each subscriber necessarily has is to be the same for all of the subscriber's terminations (or termination sets). However, different subscribers may have different definitions. Some of the more likely definitions include agent availability (agents not handling calls/total number of agents), throughput (rate of call arrival/rate of call completion), calls in queue (number of calls queued for handling), utilization ((calls being handled + calls in queue)/total agents), average speed of answer (time that calls wait before being handled by an agent, average over an appropriate time interval).

Those definitions of availability, such as calls in queue in which a larger value represents decreased availability, are written into the TADB database as negative quantities, so that the polarity requirements for availability are met.

The availability of call handing resources represented by the termination sets are regularly monitored by other components of the network such as ICR 10. The definitions of availability for each subscriber have been input to ICR 10 so that those definitions are used. The updated availabilities from ICR 10 are provided to TADB 14 at regular intervals, using the abovenoted ICLA command language.

To maintain the availability of the respective terminations as accurately as possible, TADB 14 also accounts for calls it has directed to each of the terminations. This is referred herein as a depletion factor, or simply depletion, and is a value a subscriber can set up that depletes or decreases a termination's availability each time a call is sent thereto. It provides for a "fine tuning" of availability for that termination between updates and represents the number of call completions to that termination.

To allow for calls ending, a repletion factor, or simply repletion, can also be defined by the subscriber and applied to the termination set to which a candidate termination is associated. Repletion is a time based factor. Putting it differently, assume that each call averages 2 minutes in duration. Thus, for every two minutes, the termination is assumed to be available to take another call. Thus, for the example given, the availability of the termination needs to be readjusted every two minutes. Accordingly, TADB 14 applies the repletion on a time basis, rather than an incoming call basis. Thus, by successively readjusting the availability of a termination based on a predetermined period of time, a subscriber can readjust the availability of a given termination for successive periods of time. Note that repletions are specifically defined individually for each termination set and are assumed to be of the appropriate units and polarity for the definition of availability that is used. Thus, both depletion and repletion are applied to the termination set associated with the termination that has been selected by a routing request.

ICR 10 can provide a minimum amount of load balancing based only on where TADB 14 has directed calls to be sent. However, this load balancing by ICR 10 receives no feedback from the subscriber terminations. Effectively, this would load the call traffic evenly across all terminations, with no information on the calls themselves (i.e., the duration of the calls). This is the mode of operation for load balancing if the links to the subscriber premise equipment such as ICRW 36 are disrupted.

With the subscriber premise equipment present and functioning, TADB 16 can maintain a database of all terminations that are candidates for call-by-call routing, due to the updates provided from the premise equipment. These updates may be from 5 to 60 seconds and the termination database is updated with the subscriber ACD data that indicates the availability of each termination operated by the subscriber.

At times the DAPs 8 would not follow the recommendation provided by the premise equipment to further update the availability of the terminations. This may be due to for example congestion control override or time-out by the ICR 10.

When ICR 10 is in load balancing mode, it will use all of the terminations of the subscriber without regard to the percent allocation for each of the terminations. This allows the subscribers to set up 0% allocation terminations that can be considered as "overflow" sites that are not used by the PPA routing method, but are available for the PLB and PALB methods.

When the PLB and the PALB methods are used in call routing, the availabilities of the termination sets associated with those terminations that are listed as candidate terminations in the call request are compared to find the most available candidate termination. Sometimes two or more terminations in a particular termination set are equally available due to the following reasons: (1) these terminations are associated with termination sets that by chance happen to have the same availability at that instant; and (2) two or more terminations in the request are associated with the same termination set. Given the latter scenario, special account must be taken to ensure that calls are balanced across the terminations involved.

The load balancing methods resolve equally available terminations by designating a predetermined order to which successive calls are to be routed to those terminations. Such a predetermined routing of calls may be based on the aforenoted PPA, UCD or SAR methods. Thus, each of the terminations deemed to be tied with another termination is allocated an equal percentage for this purpose; and the PPA (UDC or SAR) method may be used to select the termination to which the call is routed. Consecutive calls are thus distributed evenly among the equally available terminations.

In order to provide some preferential selection of the terminations (for example some terminations may be closer and therefore cheaper to send calls to), subscribers may optionally enter a priority for each termination from NET- CAP 30. This allows ICR 10 to band groups of terminations together and consider the most available termination within a group. Terminations with 0% allocation may be considered to be "overflow" sites, and assigned varying priorities in order of preference of use. This effectively provides subscriber control over their terminations. Changes to these priorities may be done through NETCAP 30.

Thus, each candidate termination in a routing request has a priority associated with it. For the instant invention, the priority of each termination is are deemed to have a value in the range of 0–99, with 0 being the highest priority. Given that priority allows the candidate terminations to be band by preference, load balancing can be performed initially only among those candidate terminations that have the highest priority. And only when the load balancing method fails to produce a suitably available termination from those having the highest priority are the next lower priority terminations to be considered, in descending order, until one termination is found, or until all of the terminations are exhausted. Of course, if all candidate terminations end up having the same priority, then this comparison of candidate terminations banded together with the same priority is effectively disabled. Subsequently, all candidate terminations are considered for load balancing. Note that the priorities do not have to start at any particular value, or indeed to have any contiguous values. Rather, the processing simply starts at the highest available priority (lowest number), and proceeds downwards.

The lowest allowed priority, namely 99, has a special significance. It indicates a default termination. This default termination has particular significance in that, if it is present and if after consideration of all of the terminations having higher priorities found that no suitable available termination is present, then the call will be routed to this default priority termination.

In order to provide the customer with real time control over traffic routing, the PLB method may be used. Specifically, the PALB method is an extension of the PALB method in that it includes thresholds that are set up at the customer workstation. These thresholds are applied at the agent pool level, on which the calculation of the availability of the termination is based, i.e. the call handling resource. To this end, two thresholds, which can be used to limit the amount of traffic sent to a termination, are associated with each termination set.

The first threshold is an overflow reject threshold. This threshold indicates at what level an agent pool is considered busy enough that it cannot accept calls "overflowed" from another agent pool. In other words, this overflow to the threshold signifies the level of availability below which a termination set is considered too busy to accept calls which have been rejected from other termination sets.

The second threshold is a reject threshold. This threshold indicates the level at which the agent pool is too busy to accept any more calls. In other words, it indicates the level of availability below which the termination set is considered too busy to accept any more calls. These thresholds may be applied with or without priorities, and can also be used individually.

The termination(s) that is/are initially identified during load balancing as the most available is/are known as the "first choice" candidate termination(s). The availability of the termination set associated with each of these candidate terminations is compared against the reject threshold (if enabled). If none of these candidate terminations passes the threshold test, the next most available termination(s) are identified. Since the call has been rejected by the first choice candidate termination(s), the availabilities of these (and any subsequent) candidate terminations(s) are compared against both thresholds (if both thresholds are enabled) to determine if any can accept the call. If all terminations fail the threshold tests, then the selection reverts to the "first choice" candidate terminations and the respective priorities of these "first choice" candidate terminations are reviewed.

The reject and overflow threshold are set by a subscriber from his premise based equipment. The value set for the thresholds are then routed to ICR 10, which is responsible for ensuring that those thresholds are noted in the termination database for the different terminations.

With reference to FIGS. 10A–10D, a detailed description of the various steps of the load balancing methods of the instant invention is given. For this discussion, both PLB and PALB methods are considered to be the load balancing method.

To begin, a routing request for a special service call is received in block 102.

In block 104, all termination set records associated with the candidate terminations for the special service call are retrieved from TADB 16. Each termination set record contains two fields of availability: AVAILABILITY, into which updates from external systems are written; and TADB AVAILABILITY, which TADB 16 modifies dynamically.

As noted above, there are two internal factors, namely repletion and depletion, that TADB 16 uses to update the availability of the various candidate terminations between external availability updates from the subscriber. And, as shown in block 106, repletion is applied to each of the termination sets, specifically to update the TADB AVAILABILITY field.

Since the magnitude of repletion is a function of the time that has elapsed since the last external update of availability, the repleted availability is not written back into the TADB database 15. Rather, the repletion calculation is performed each time a call request is received, using the total time elapsed since the last external update. As was mentioned previously, the repletion factor and operators are specified individually for each termination set, and are assumed to be of appropriate units and polarity for the definition of availability that is being used.

In block 108, the candidate termination list that is stored in the termination database is sorted by priority. As noted, priority may be specified as a number ranging from 0 to 99 and each termination noted in the call request has a priority associated with it. The use of priority allows candidate terminations to be banded by preference so that load balancing is performed initially only among those candidate terminations that have the highest priority. Only after a suitably available termination is not found from those candidate terminations having the highest priority would lower priority candidate terminations be considered. If all candidate terminations have the same priority, this feature is effectively disabled, and all candidate termination will be considered for load balancing.

The candidate termination list may have one termination assigned with the lowest possible priority, i.e. 99. This is the default termination noted above. In particular, this default termination is selected if, after consideration of all terminations having higher priorities, no suitable available termination was found. A default termination may or may not be included in the candidate termination list.

In block 110, a subset of candidate terminations is selected by identifying the various candidate terminations with the highest priority. These various terminations may vary according to the subscriber's needs, from a minimum of a single candidate termination at the top of the candidate termination priority list to a maximum of all candidate terminations.

This priority subset is then sorted by reviewing the TADB AVAILABILITY field of the associated termination set of each candidate termination, as reflected in block 112.

In block 114, a most available termination list is created by adding all candidate terminations from the top of the candidate termination list, i.e. those with the highest TADB AVAILABILITY value. All candidate terminations in the most available list will have the same TADB AVAILABILITY value.

A determination is then made in block 116 on whether this is the first selection of candidate terminations for this particular routing request. If it is, then each candidate termination with the highest value of TADB AVAILABILITY is placed in a first choice list, as shown in block 118. This first choice list is to be referred to if no candidate termination passes the remaining checks in the algorithm.

In order to provide subscribers with real time control of load balancing, as noted above, two thresholds are associated with each termination set to limit the amount of traffic sent to each termination set. As shown in block 120, the reject threshold is applied if it was determined in block 116 that this is the first selection of candidate terminations for this particular routing request. And this reject threshold specifies the level of availability below which the termination set is considered too busy to accept any more calls.

If, on the other hand, it is determined in block 116 that this is not the first selection of candidate terminations, the process proceeds to block 122. There both reject and overflow thresholds are applied to the associated termination sets. Thus, in addition to specifying the level of availability below which the termination set is considered too busy to accept any more calls, per the reject threshold, there is also established a level of availability below which a termination set is considered too busy to accept calls which have been rejected from other termination sets, per the overflow threshold.

A determination is next made on whether any candidate termination passes the threshold checks in block 124. If there is, a determination is made on block 126 (FIG. 10D) on whether there is more than one candidate termination remaining after the threshold checks. If there is only one, then the process proceeds to block 128 whereby the incoming call is routed to that selected termination.

In block 130, depletion is applied to the termination set that is associated with the selected termination. By applying depletion thereat, the value of the TADB AVAILABILITY of the selected termination set is decreased to reflect the decrease in termination set resource availability caused by the routing of the current call to a termination associated with that termination set.

If it is determined, per block 126 that there are more than one candidate termination, then the process proceeds to block 132 so that either a precise percent allocation (PPA), a termination array's sequential order (SAR) or a uniform call distribution (UCD) algorithm is applied to the candidate terminations per block 132. Assuming that only PPA is used, then each call request that is received is allocated, in accordance with the PPA algorithm, to the selected termination per block 134.

Thereafter, per block 136, depletion is applied to the termination set that is associated with the selected termination.

After depletion is applied to the termination set that is associated with the selected termination in either block 130 or 136, the process proceeds to block 138 so that a routing response is sent to the selected termination.

Thereafter, the process waits for the next routing request, per block 140.

Return to FIG. 10B. With reference to block 124, assume that no candidate termination has passed the threshold checks. At that point, the process proceeds to decision block 142 to make a determination on whether the priority subset that was created in block 110 has been exhausted. If not, i.e. if any candidate termination remains, the process proceeds to block 144. There, any remaining terminations whose associated termination sets have the next highest value of TADB AVAILABILITY are added to a new most available termination list. The process then proceeds to block 116, which determines that this is not the first selection for current routing request. Thereafter, reject and overflow threshold checks are again applied, per block 122, and the process as discussed above is repeated.

If all candidate terminations in the priority subset fail to pass the threshold checks, as determined in block 142, then the process proceeds to block 146 to check if the candidate termination list that was sorted by priority in block 108 has been exhausted. If not, i.e. if any candidate termination remains, then, per block 148, a new subset of candidate terminations with the next highest priority is identified. Thereafter, the process returns to block 112 so that this new subset of candidate terminations with the next highest priority is sorted. The same process for this new subset of candidate terminations begins anew from block 114. Of course, this new subset of candidate terminations will have a lower priority than those in the original priority subset. The process for this new subset of candidate terminations is repeated, starting with block 114.

If all candidate terminations that were included in the call request are exhausted, as determined in block 146, the process proceeds to block 150 (FIG. 10C) so that a determination is made on whether or not a default termination has been selected in accordance with priority of 99, for example.

If a default termination does exist, the process routes the call to that default termination and the routing request is answered. Thereafter, depletion is applied to the termination set of the selected termination, i.e. the default termination.

Thereafter, a routing response is output from the selected termination in response to the incoming call, per block 156.

The process next waits for the next routing request, per block 158.

If there has not been any default termination selected, as determined per block 150, the process proceeds to block 160 to make another determination on whether the first choice list for candidate termination is available.

Figure 10A:
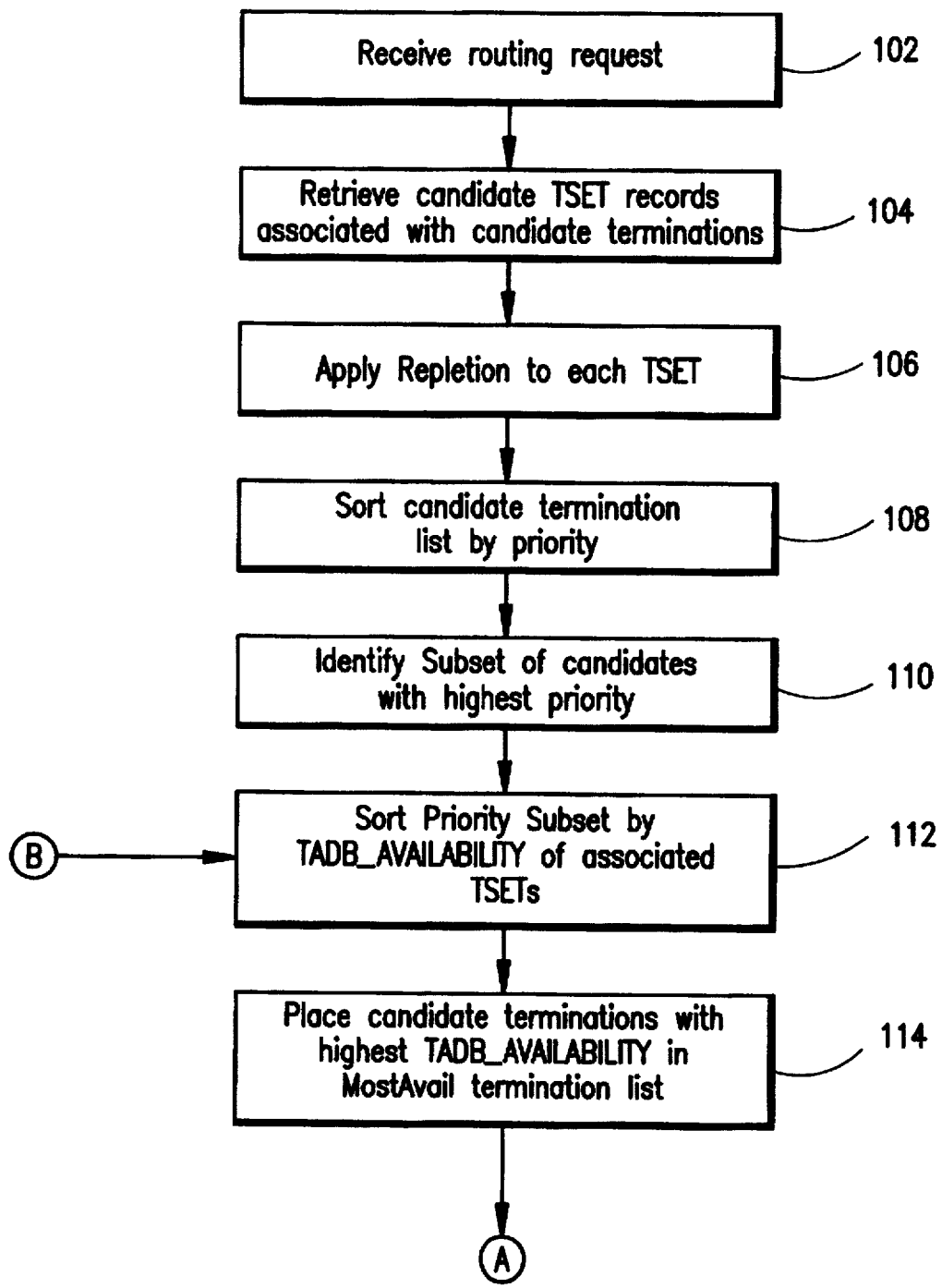
FIGS. 10A–10D in combination provide a flow chart illustrating the steps of the PLB algorithm.
Figure 10B:
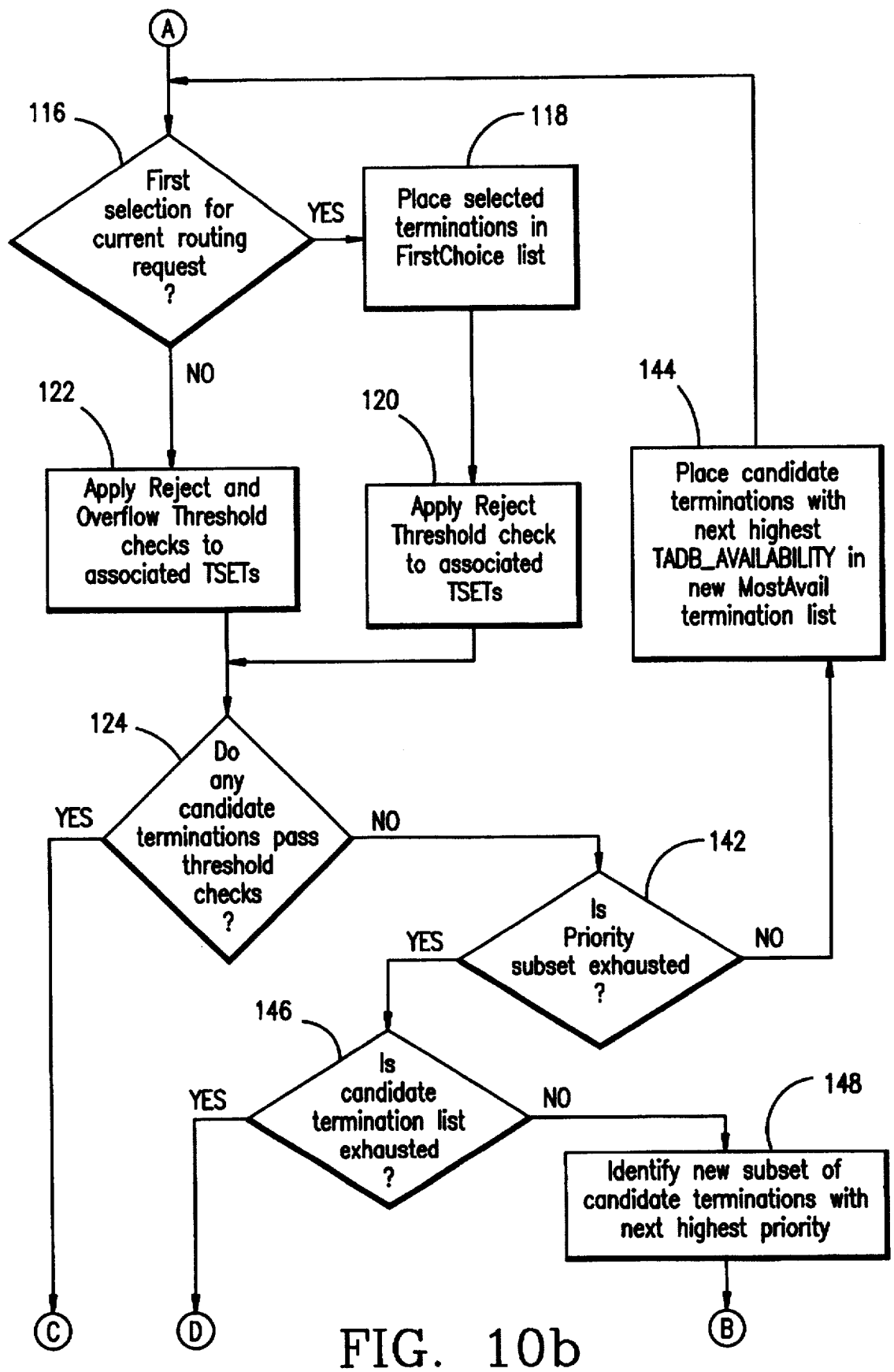
Figure 10C:
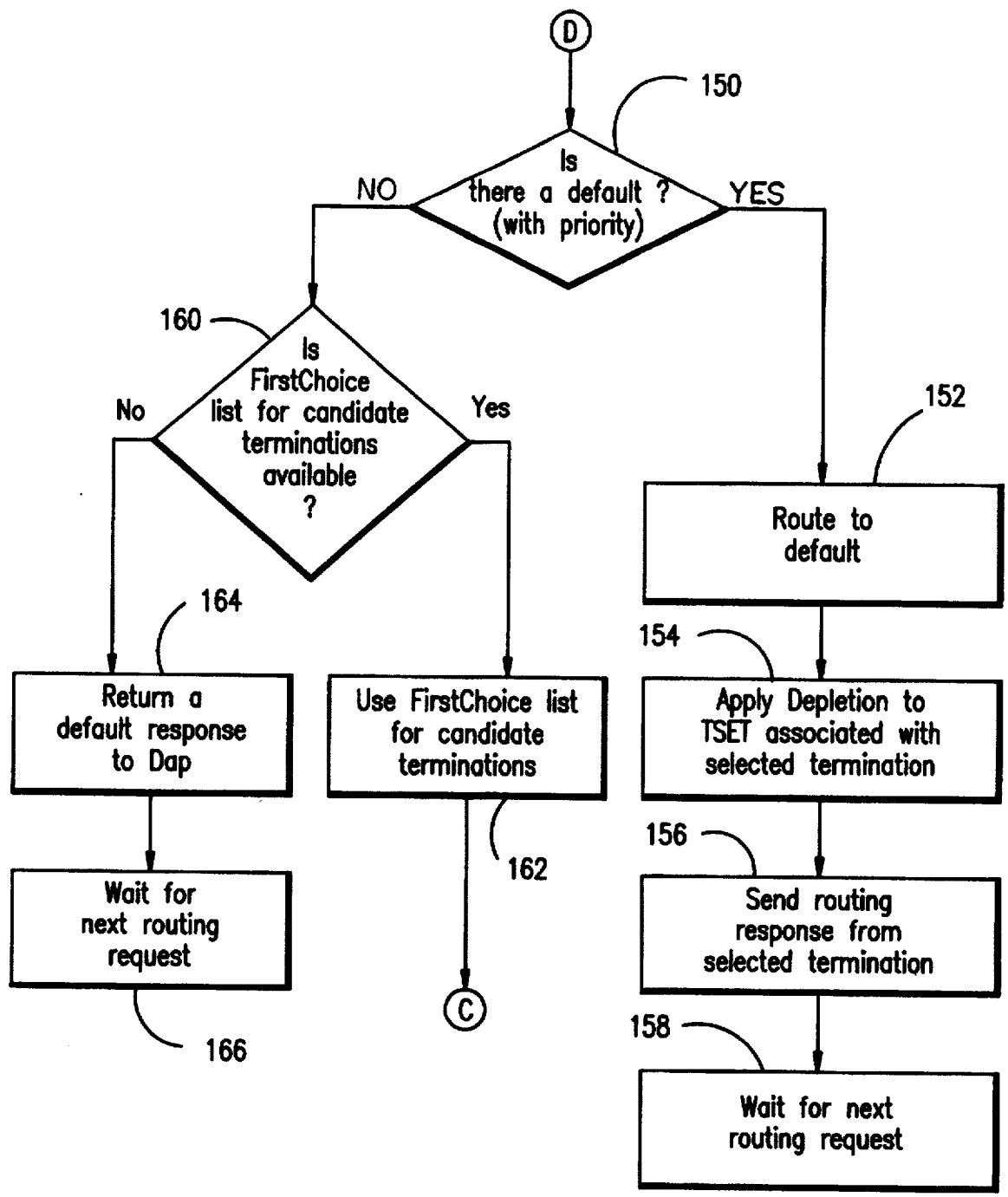
Figure 10D:
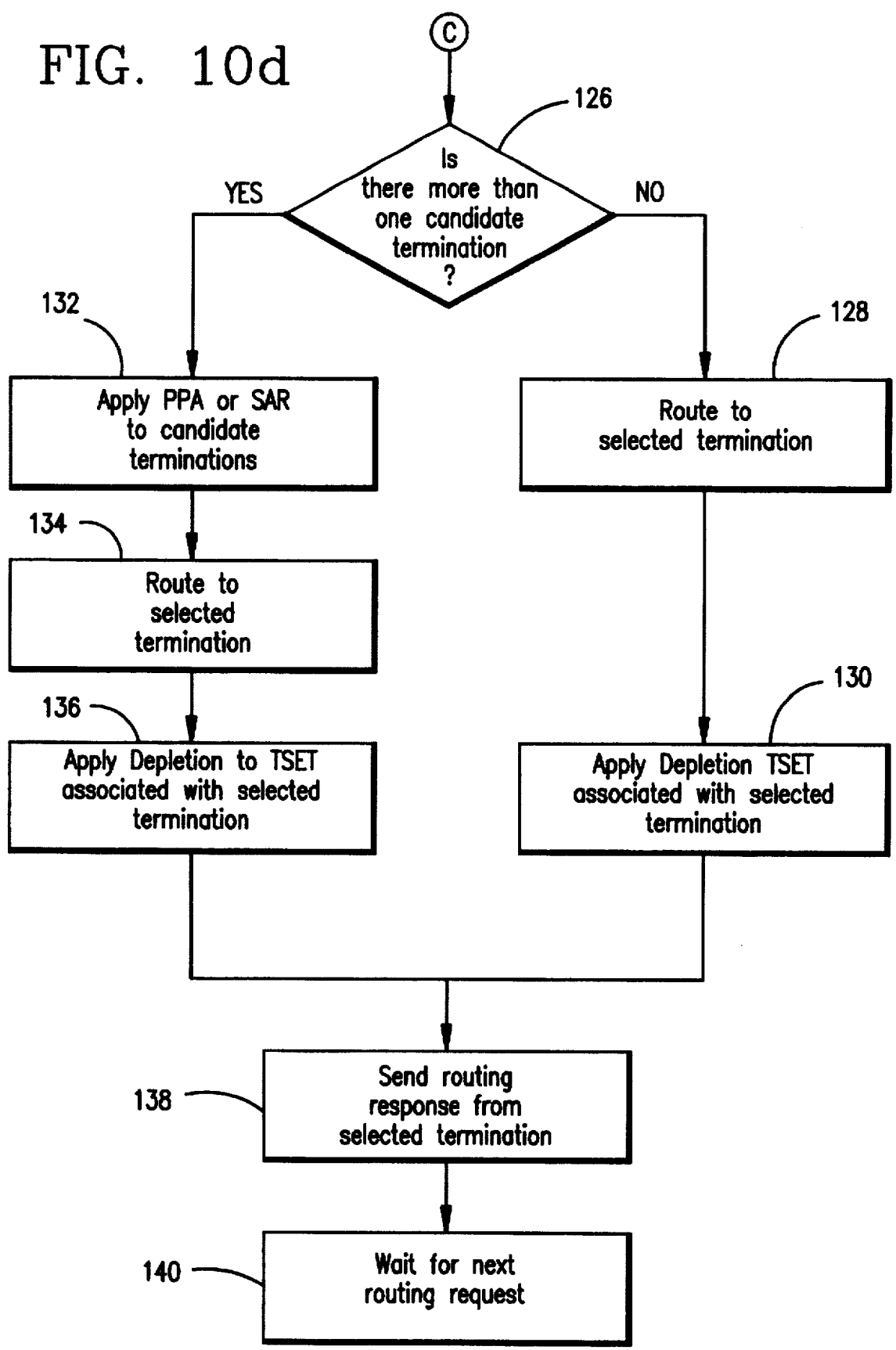

If the first choice list for candidate terminations is indeed available, then that first choice list that was created in block 118 is used, per block 162. Thereafter, the process proceeds to block 126 and the same various steps discussed with reference to FIG. 10D are repeated for those candidate terminations in the first choice list.

If, per block 160, it is determined that there is no available first choice list for candidate terminations, then the process proceeds to block 164 whereby a default response is returned to the DAP 8. Thereafter, the process goes into a waiting mode to await for the next routing request, per block 166.

Per the above discussion of FIGS. 10A–10D, note that the load balancing algorithm of the instant invention may be used in conjunction with the PPA (UCD or SAR) algorithm previously described so that the PPA (UCD or SAR) algorithm may be used as a "tie breaker" to the load balancing algorithm, as referenced in block 132. Furthermore, the PPA (UCD or SAR) algorithm may initially be used to select a termination from the list presented in the call request. However, if the selected candidate termination is unavailable or exceeds its reject threshold, then load balancing may be used to select an alternate candidate termination, based on the current availabilities of the remaining candidate terminations. This is the ancillary percent allocation with load balancing (PALB) algorithm noted above.

In sum, when utilized by the TADB, each of the PPA, SAR, PLB and PALB algorithms provides accurate routing of calls to the different terminations of a subscriber.

Inasmuch as the present invention is subject to many variations, modifications, and changes in detail, it is intended that all matters described in this specification and shown in the accompanying drawings be interpreted as illustrative only and not in a limiting sense. Accordingly, it is intended that the invention be limited only the spirit and scope of the hereto appended claims.

We claim:
1. In a telecommunications network having a plurality of termination sets each including at least one termination, a method of routing each special service call directed to a subscriber to a termination set having at least one termination best adapted to respond to said each call from among various terminations operated by said subscriber, comprising the steps of:
   a) decreasing the availability of each of said termination sets to receive further calls each time a call is routed to said each termination set;
   b) repeatedly increasing the availability of said each termination set to receive further calls after the passage of a predetermined period of time;
   c) taking into consideration the availability of said each termination set in relation to other termination sets that contain at least one of said various terminations operated by said subscriber;
   d) combining the availability as determined in steps a, b and c to ascertain the termination set most available to receive an incoming call; and
   e) routing said incoming call to said most available termination set for response.

2. The method of claim 1, further comprising the steps of:
   determining if there is more than one termination in said most available termination set to which said incoming call directed to said subscriber may be routed;
   if there is only one termination in said most available termination set to which said incoming call may be routed, routing said incoming call to said one termination; and
   if there are at least two terminations in said most available termination set to which said incoming call may be routed, routing said incoming call to the termination predeterminedly selected to receive the next incoming call.

3. The method of claim 1, further comprising the step of:
   associating each termination of said each termination set operated by said subscriber with a priority value; and
   choosing from among the terminations that have the same highest priority value the termination that is most available to receive the incoming call.

4. The method of claim 1, wherein said network further comprises a termination database having data for said termination sets, said method further comprising the steps of:
   establishing a candidate termination set list for said subscriber that includes all termination sets having at least one termination operated by said subscriber in said termination database; and
   establishing respective priorities for said termination sets in said candidate termination set list by comparing the availability of the respective terminations of said termination sets.

5. The method of claim 1, further comprising the step of:
   designating a termination as a default termination;
   routing the incoming call to said default termination if after consideration of all terminations having priority values, no suitably available termination was found to route said incoming call.

6. The method of claim 1, wherein if a determination is made in said step d that there is more than one most available termination set, the method further comprising the step of:
   utilizing an ordered list to ascertain the predetermined next most available termination set to route said call.

7. The method of claim 1, further comprising the step of:
   establishing a reject availability threshold below which said each termination set is considered to be too busy to accept any more calls.

8. The method of claim 1, further comprising the step of:
   establishing an overflow availability threshold below which said each termination set is considered to be too busy to accept calls rejected from other termination sets.

9. The method of claim 1, wherein said step c further comprises the steps of:
   monitoring the operation of the network and the respective operations of said termination sets; and
   updating the availability of each respective ones of said termination sets by updating data relating to the agent availability, the throughput, the calls in queue, the utilization and the average speed of answer time for each said respective termination set.

10. The method of claim 1, further comprising the step of:
    representing the availability of a termination set to receive incoming calls as a signed number which value increases with greater availability.

11. The method of claim 1, further comprising the step of:
    definig availability as agent availability, throughput, calls in queue, utilization, and average speed of answer time.

12. In a telecommunications network having a plurality of terminations, a method of routing each special service call directed to a subscriber to a termination best adapted to respond to said call from among various terminations operated by said subscriber, comprising the steps of:
   a) decreasing the availability of each of said terminations to receive further calls each time a call is received by said each termination;
   b) increasing the availability of said each termination to receive further calls after each successive passage of a predetermined period of time;
   c) taking into consideration the availability of said each termination in relation to said various terminations operated by said subscriber;
   d) combining the availability as determined in steps a, b and c to ascertain the termination operated by said subscriber that is most available to receive an incoming call; and
   e) routing said incoming call to said most available termination for response.

13. The method of claim 12, further comprising the steps of:

associating each of said terminations operated by said subscriber with a priority value; and choosing from among said terminations having the same highest priority value the termination that is most available to receive said incoming call.

14. The method of claim 12, wherein sad network further comprises a termination database having data for both termination sets and terminations, each termination set may include a number of said terminations, said method further comprising the steps of:

establishing a candidate termination list for said subscriber that includes all terminations operated by said subscriber in said termination database; and setting respective priorities for said all terminations in said candidate termination list by comparing the respective availabilities of said all terminations.

15. The method of claim 12, further comprising the step of:

establishing a reject availability threshold below which each of said terminations is considered to be too busy to accept any more calls.

16. The method of claim 12, further comprising the step of:

establishing an overflow availability threshold below which each of said terminations is considered to be too busy to accept calls rejected from other termination sets.

17. The method of claim 12, further comprising the step of:

defining availability as agent availability, throughput, calls in queue, utilization, and average speed of answer time.

18. The method of claim 12, further comprising the step of:

representing the availability of each of said terminations to receive incoming calls as a signed number which value increases with greater availability.

19. In a telecommunications network having a plurality of terminations, a method of accurately maintaining the availability of each termination operated by a subscriber to which incoming calls to said subscriber are routable, comprising the steps of:

a) decreasing the availability of said each termination to receive further calls each time a call is received by said each termination;

b) increasing the availability of said each termination to receive further calls after each successive passage of a predetermined period of time;

c) taking into consideration the priority of availability of said each termination in relation to all terminations operated by said subscriber; and d) combining the availability as determined in steps a, b and c to ascertain the readiness with which said each termination will receive an incoming call.

20. The method of claim 19, further comprising the steps of:

associating each of said terminations operated by said subscriber with a priority value; and choosing from among said terminations having the same highest priority value the termination that is most available to receive said incoming call.

21. The method of claim 19, wherein said network further comprises a termination database having data for both termination sets and terminations, each termination set may include a number of said terminations, said method further comprising the steps of:

establishing a candidate termination list in said termination database that includes each of said termination sets; and establishing a priority of availability for said each termination set in said candidate termination list by comparing the availability of each of said termination sets relative to the other termination sets.

22. The method of claim 19, further comprising the step of:

establishing a reject availability threshold below which each of said terminations is considered to be too busy to accept any more calls.

23. The method of claim 19, further comprising the step of:

establishing an overflow availability threshold below which each of said terminations is considered to be too busy to accept calls rejected from other termination sets.

24. The method of claim 19, further comprising the step of:

defining availability as agent availability, throughput, calls in queue, utilization, and average speed of answer time.

25. The method of claim 19, further comprising the step of:

representing the availability of each of said terminations to receive incoming calls as a signed number which value increases with greater availability.

* * * * *